US012441956B2

(12) United States Patent
Kita et al.

(10) Patent No.: US 12,441,956 B2
(45) **Date of Patent: *Oct. 14, 2025**

(54) DETERGENT COMPOSITION FOR FIBERS

(71) Applicant: KAO CORPORATION, Tokyo (JP)

(72) Inventors: Ayako Kita, Wakayama (JP); Yoshinori Otani, Wakayama (JP); Hiroki Takumi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 18/267,876

(22) PCT Filed: Dec. 23, 2021

(86) PCT No.: PCT/JP2021/047862

§ 371 (c)(1),
(2) Date: Jun. 16, 2023

(87) PCT Pub. No.: WO2022/138820

PCT Pub. Date: Jun. 30, 2022

(65) Prior Publication Data

US 2024/0060004 A1 Feb. 22, 2024

(30) Foreign Application Priority Data

Dec. 25, 2020 (JP) ................................. 2020-217303

(51) Int. Cl.
*C11D 1/14* (2006.01)
*C11D 1/28* (2006.01)
*D06M 13/256* (2006.01)

(52) U.S. Cl.
CPC .................. *C11D 1/14* (2013.01); *C11D 1/28* (2013.01); *D06M 13/256* (2013.01); *C11D 2111/12* (2024.01)

(58) Field of Classification Search
CPC ............. D06M 13/256; D06M 13/224; D06M 2200/40; C11D 1/28; C11D 1/14; C11D 1/37; C11D 1/123; C11D 2111/12; C11D 1/143
See application file for complete search history.

(56) References Cited

U.S. PATENT DOCUMENTS

| | | | |
|---|---|---|---|
| 4,434,087 | A | 2/1984 | Hampson et al. |
| 6,048,831 | A | 4/2000 | Mori et al. |
| 8,454,709 | B2 | 6/2013 | Man et al. |
| 9,877,906 | B2 | 1/2018 | Doi et al. |
| 2007/0214999 | A1 | 9/2007 | Meyer et al. |
| 2014/0076344 | A1 | 3/2014 | Doi et al. |
| 2017/0281498 | A1 | 10/2017 | Yoshikawa et al. |
| 2019/0169536 | A1 | 6/2019 | Tabuchi et al. |

FOREIGN PATENT DOCUMENTS

| | | | | |
|---|---|---|---|---|
| CN | 102712563 | A | | 10/2012 |
| CN | 106833925 | A | | 6/2017 |
| CN | 109072129 | A | | 12/2018 |
| CN | 109679778 | A | | 4/2019 |
| EP | 0365170 | A1 | | 4/1990 |
| EP | 2899258 | A1 | | 7/2015 |
| EP | 3467081 | A1 | | 4/2019 |
| EP | 3498811 | A1 | | 6/2019 |
| JP | S5753600 | A | | 3/1982 |
| JP | S62195096 | A | | 8/1987 |
| JP | H02182967 | A | | 7/1990 |
| JP | H03153798 | A | | 7/1991 |
| JP | H08325935 | A | | 12/1996 |
| JP | 2005154505 | A | | 6/2005 |
| JP | 2010126561 | A | | 6/2010 |
| JP | 2011190554 | A | | 9/2011 |
| JP | 2014076988 | A | | 5/2014 |
| JP | 2015028123 | A | | 2/2015 |
| JP | 2015120984 | A | * | 7/2015 |
| JP | 2017214567 | A | | 12/2017 |
| JP | 2018066102 | A | | 4/2018 |
| JP | 2020063435 | A | | 4/2020 |
| WO | WO-1998024865 | A1 | | 6/1998 |
| WO | WO-2015125753 | A1 | | 8/2015 |
| WO | WO-2016196555 | A1 | | 12/2016 |
| WO | WO-2017204149 | A1 | | 11/2017 |
| WO | WO-2018030328 | A1 | | 2/2018 |
| WO | WO-2021187488 | A1 | | 9/2021 |

OTHER PUBLICATIONS

JP-2005154505A.
JP-2015028123A, US-2017/0281498-A1.
JP-2017214567A, EP-3467081A1.
JP-2020063435A.
WO-1998024865A1, US-6048831-A1.
WO-2017204149A1.
WO-2018030328A1, US-2019/0169536-A1.
English translation of the International Preliminary Report on Patentability and Written Opinion issued Jul. 6, 2023 in PCT/JP2021/047862, 6 pages.
International Search Report issued Mar. 1, 2022 in PCT/JP2021/047862 (with English translation), 4 pages.
J. Stapersma et al., "Hydroxy Alkane Sulfonate (HAS), a New Surfactant Based on Olefins", J. Am. Oil Chem. Soc., vol. 69, No. 1, Jan. 1992, pp. 39-43.
CN-106833925A.
JP-2010126561A.
JP-2014076988A, EP 2899258A1.
JP-H02182967A, EP 0365170A1.
WO-2016196555A1.
WO-2021187488A1.

(Continued)

*Primary Examiner* — Vishal V Vasisth
(74) *Attorney, Agent, or Firm* — Element IP, PLC

(57) ABSTRACT

The present invention is a friction reducing agent for fibers containing the following components (a) and (b), and further, a detergent composition for fibers containing the following components (a) and (b), wherein a proportion of a content of component (b) to a total content of components (a) and (b) is 20 mass % or more and less than 100 mass %, component (a): an internal olefin sulfonate with 17 or more and 24 or less carbons, and component (b): a sulfosuccinic acid ester or a salt thereof having a hydrocarbon group with 5 or more and 18 or less carbons.

8 Claims, No Drawings

(56) References Cited

OTHER PUBLICATIONS

Extended European Search Report issued Dec. 23, 2024, in corresponding European Patent Application No. 21910957.6, 10 pages.
English translation of the International Preliminary Report on Patentability and Written Opinion issued Jul. 6, 2023 in PCT/JP2021/047861, 7 pages.
English translation of the International Preliminary Report on Patentability and Written Opinion issued Jul. 6, 2023, in PCT/JP2021/047860, 7 pages.
International Search Report issued Mar. 1, 2022, in PCT/JP2021/047861 (with English translation), 5 pages.
International Search Report issued Mar. 1, 2022, PCT/JP2021/047860 (with English translation), 4 pages.
Office Action mailed Oct. 18, 2024, in co-pending U.S. Appl. No. 18/268,654.
Office Action mailed Oct. 18, 2024, in co-pending U.S. Appl. No. 18/269,313.
Extended European Search Report issued Mar. 17, 2025, in corresponding European Patent Applicaiton No. 21910959.2, 11 pages.
CN-102712563A, US 20120270764A1.
CN-109072129A, WO 2017204149A1.
CN-109679778A.
Combined Chinese Office Action and Search Report issued Apr. 3, 2025, in corresponding Chinese Patent Application No. 202180087407.0 (with partial English translation), 13 pages.

* cited by examiner

DETERGENT COMPOSITION FOR FIBERS

This application is a 371 of PCT/JP2021/047862 filed Dec. 23, 2021

FIELD OF THE INVENTION

The present invention relates to a friction reducing agent for fibers, a detergent composition for fibers and a method for treating a textile product.

BACKGROUND OF THE INVENTION

Conventionally, anionic surfactants such as alkylbenzene sulfonates, alkyl sulfates, polyoxyethylene alkyl ether sulfates, internal olefin sulfonates, sulfosuccinic acid ester salts or the like have been used as detergent components for home use and industrial use.

JP-A 2015-28123 discloses an internal olefin sulfonate composition excellent in foamability or the like containing an internal olefin sulfonate having 16 carbon atoms and an internal olefin sulfonate having 18 carbon atoms at a specific ratio, wherein hydroxy species/olefin species is a specific ratio.

WO-A 2018/030328 discloses a surfactant composition containing an internal olefin sulfonic acid and/or a salt thereof, an anionic surfactant other than the internal olefin sulfonic acid and/or salt thereof, a nonionic surfactant and water under a predetermined condition.

WO-A 1998/024865 discloses a surfactant composition useful as a liquid detergent for clothes containing a predetermined nonionic surfactant and an anionic surfactant selected from among alkylsulfofatty acid salts, dialkylsulfosuccinic acid salts and others at a predetermined formulation ratio.

Further, in recent years, the diversification of consumers' sense of values has led to a demand for detergents that achieve high finishing performance in various aspects such as better stain removal, softening of textile products or the like, and the development of detergents meeting such demands has also been considered in various ways (JP-A 2005-154505 and JP-A 2020-63435).

SUMMARY OF THE INVENTION

There is a problem that, when textile products are washed in a washing machine, it is difficult to remove the textile products from the washing machine after washing because fibers in wet condition become entangled with one another during the washing process. This is considered to be caused by frictional force given rise to between fibers in wet condition during washing. When frictional force between fibers becomes stronger, textile products after drying are easy to wrinkle and their softness also tends to decrease.

The present invention provides a friction reducing agent for fibers further reducing frictional force between fibers in wet condition, thereby making it easier to remove textile products from a washing machine after washing, and a detergent composition for fibers and a method for treating a textile product attaining both washing performance and finishing performance (softening performance and wrinkle reducing performance) even under actual use environments.

The present invention relates to a friction reducing agent for fibers containing the following components (a) and (b), component (a): an internal olefin sulfonate with 17 or more and 24 or less carbons, and component (b): a sulfosuccinic acid ester or a salt thereof having a hydrocarbon group with 5 or more and 18 or less carbons, wherein a proportion of a content of component (b) to a total content of components (a) and (b) is 20 mass % or more and less than 100 mass %.

Further, the present invention relates to a method for reducing friction between fibers including, bringing the above components (a) and (b) into contact with the fibers in such amounts that a proportion of an amount of component (b) to a total amount of components (a) and (b) is 20 mass % or more and less than 100 mass %.

Further, the present invention relates to a detergent composition for fibers containing the above components (a) and (b), wherein a proportion of a content of component (b) to a total content of components (a) and (b) is 20 mass % or more and less than 100 mass %.

Further, the present invention relates to a method for treating a textile product including, washing the textile product with a washing liquid obtained by mixing the above components (a) and (b) with water, and thereafter rinsing the textile product with water, wherein a proportion of a content of component (b) in the washing liquid to a total content of components (a) and (b) in the washing liquid is 20 mass % or more and less than 100 mass %.

According to the present invention, provided are a friction reducing agent for fibers and a method for reducing friction between fibers further reducing frictional force between fibers in wet condition, thereby making it easier to remove textile products from a washing machine after washing, and a detergent composition for fibers and a method for treating a textile product attaining both washing performance and finishing performance (softening performance and wrinkle reducing performance) even under actual use environments.

Embodiments of the Invention

The present invention is based on the finding that a friction reducing agent for fibers and a method for reducing friction between fibers further reducing frictional force between fibers in wet condition, thereby enabling easier removal of textile products from a washing machine after washing (for example, after dehydration) are obtained by using the above components (a) and (b) at a predetermined proportion. Further, the present invention is based on the finding that a detergent composition for fibers and a method for treating a textile product attaining both washing performance and finishing performance (softening performance and wrinkle reducing performance) even under actual use environments are obtained by using the above components (a) and (b) at a predetermined proportion. While the mechanism for this is uncertain, it is inferred that the friction reducing agent for fibers and the detergent composition for fibers of the present invention reduce frictional force between fibers in wet condition during washing while maintaining good washing performance as a hydrate solid of component (b) is formed on the surface of the fibers. The hydrate solid also includes component (a), and the synergistic effect of a combination of component (a), a specific anionic surfactant, and component (b), a specific anionic surfactant different from component (a), is considered to improve the formation of the hydrate solid, which contributes to the reduction of frictional force between fibers in wet condition. It is considered that entanglement of textile products is thus suppressed, providing a friction reducing agent for fibers and a method for reducing friction between fibers enabling easier removal of textile products from a washing machine after washing (for example, after dehydration), and a detergent composition for fibers and a method for treating a textile product attaining both washing performance and finishing performance (softening performance and wrinkle reducing performance) even under actual use environments.

<Friction Reducing Agent for Fibers and Method for Reducing Friction Between Fibers>

The friction reducing agent for fibers of the present invention contains an internal olefin sulfonate with 17 or more and 24 or less carbons, component (a), and a sulfosuccinic acid ester or a salt thereof having a hydrocarbon group with 5 or more and 18 or less carbons, component (b), wherein a proportion of a content of component (b) to a total content of components (a) and (b) is 20 mass % or more and less than 100 mass %.

The friction reducing agent for fibers of the present invention is an agent for imparting a friction reducing effect to fibers, and contains components (a) and (b) as its active components.

Component (a) of the present invention is an internal olefin sulfonate with 17 or more and 24 or less carbons. In component (a), the carbon number of the internal olefin sulfonate represents the carbon number of an internal olefin that forms a covalent bond with a sulfonic acid salt. In component (a), the internal olefin sulfonate has preferably 18 or more, and preferably 22 or less and more preferably 20 or less carbons from the viewpoints of reduction of frictional force between fibers in wet condition, washing performance, softening performance and reduction of wrinkles.

The internal olefin sulfonate of component (a) is a sulfonate obtained by sulfonating, neutralizing and hydrolyzing internal olefins (olefins having a double bond inside the olefin chains) with 17 or more and 24 or less carbons as a raw material. Such internal olefins also include those containing trace amounts of so-called alfa olefins (hereinafter also referred to as α-olefins) in which the position of a double bond is present at position 1 of the carbon chains. Further, the sulfonation of the internal olefins quantitatively produces β-sultones, and part of β-sultones change into γ-sultones and olefin sulfonic acids, which are further converted into hydroxy alkane sulfonates and olefin sulfonates in the neutralization and hydrolysis processes (for example, J. Am. Oil Chem. Soc. 69, 39(1992)). Here, in the obtained hydroxy alkane sulfonates, a hydroxy group is inside the alkane chains, and in the olefin sulfonates, a double bond is inside the olefin chains. Further, the obtained product is mainly a mixture of them, and may also partially include trace amounts of hydroxy alkane sulfonates having a hydroxy group at the end of the carbon chains or olefin sulfonates having a double bond at the end of the carbon chains.

In the present specification, each of these products and a mixture of them are collectively referred to as the internal olefin sulfonate (component (a)). Further, hydroxy alkane sulfonates are referred to as hydroxy species of internal olefin sulfonates (hereinafter also referred to as HAS species), and olefin sulfonates are referred to as olefin species of internal olefin sulfonates (hereinafter also referred to as IOS species).

Note that the mass ratio between HAS species and IOS species in the compound of component (a) can be measured by high-performance liquid chromatography mass spectrometry (hereinafter abbreviated as HPLC-MS). Specifically, the mass ratio can be determined from HPLC-MS peak areas for component (a).

Examples of a salt of the internal olefin sulfonate include alkali metal salts, alkaline earth metal (½ atom) salts, ammonium salts or organic ammonium salts. Examples of the alkali metal salts include a sodium salt and a potassium salt. Examples of the organic ammonium salts include alkanol ammonium salts with 2 or more and 6 or less carbons including alkanol amines described later. The organic ammonium salts also include salts of amines. The salt of the internal olefin sulfonate is preferably an alkali metal salt and more preferably a sodium salt or a potassium salt from the viewpoints of reduction of frictional force between fibers in wet condition, washing performance, softening performance, reduction of wrinkles and versatility.

As is clear from the above producing method, a sulfonic acid group in the internal olefin sulfonate of component (a) is present inside the carbon chains, i.e., olefin chains or alkane chains, of the internal olefin sulfonates, and component (a) may also partially include trace amounts of compounds in which a sulfonic acid group is present at the ends of the carbon chains.

A content of an internal olefin sulfonate with a sulfonic acid group present at position 5 or more and preferably position 5 or more and 9 or less in component (a) is preferably 5 mass, or more, more preferably 10 mass % or more, further preferably 15 mass % or more and furthermore preferably 20 mass % or more, and preferably 60 mass % or less, more preferably 55 mass % or less, further preferably 45 mass % or less and furthermore preferably 40 mass % or less from the viewpoints of reduction of frictional force between fibers in wet condition, washing performance, reduction of wrinkles and improvement of softness of fibers.

In component (a), a mass ratio of a content of an internal olefin sulfonate with a sulfonic acid group present at position 2 or more and 4 or less [hereinafter sometimes referred to as (IO-1S)] to a content of an internal olefin sulfonate with a sulfonic acid group present at position 5 or more and preferably position 5 or more and 9 or less [hereinafter sometimes referred to as (IO-2S)], (IO-1S)/(IO-2S), is preferably 0.5 or more, more preferably 0.8 or more, further preferably 1.0 or more, furthermore preferably 1.5 or more, furthermore preferably 2 or more, furthermore preferably 2.5 or more, furthermore preferably 3 or more, furthermore preferably 4 or more and furthermore preferably 4.5 or more from the viewpoints of reduction of frictional force between fibers in wet condition, washing performance, reduction of wrinkles and improvement of softness of fibers, and preferably 10 or less, more preferably 8 or less and further preferably 6 or less from the viewpoints of reduction of frictional force between fibers in wet condition, washing performance, softening performance, reduction of wrinkles and ease of production.

Note that the contents of the compounds having a sulfonic acid group at different positions in component (a) can be measured by HPLC-MS. In the present specification, the contents of the compounds having a sulfonic acid group at different positions are determined as mass proportions based on the HPLC-MS peak areas of the compounds having a sulfonic acid group at their respective positions in all HAS species of component (a).

In component (a), a content of an olefin sulfonate with a sulfonic acid group present at position 1 in component (a) is preferably 10 mass % or less, more preferably 7 mass % or less, further preferably 5 mass % or less and furthermore preferably 3 mass % or less from the viewpoints of reduction of frictional force between fibers in wet condition, washing performance, reduction of wrinkles and the ability to impart good softness to fibers, and preferably 0.01 mass % or more from the viewpoints of reduction of production costs and improvement of productivity.

The positions of a sulfonic acid group in these compounds are positions in olefin chains or alkane chains.

The internal olefin sulfonate can be a mixture of hydroxy species and olefin species. A mass ratio of a content of olefin species of internal olefin sulfonates to a content of hydroxy species of internal olefin sulfonates in component (a) (olefin species/hydroxy species) can be 0/100 or more and further 5/95 or more, and 50/50 or less, further 40/60 or less, further 30/70 or less and further 25/75 or less.

The mass ratio of the content of olefin species of internal olefin sulfonates to the content of hydroxy species of internal olefin sulfonates in component (a) can be measured by the method described in Examples with HPLC-MS from component (a).

Component (a) can be produced by sulfonating, neutralizing and hydrolyzing, for example, an internal olefin with 18 carbons as a raw material. The sulfonation reaction can be carried out by reacting 1.0 to 1.2 mol of sulfur trioxide gas with 1 mol of the internal olefin. It can be carried out at a reaction temperature of 20 to 40° C.

The neutralization is carried out by reacting an aqueous alkali solution such as potassium hydroxide, ammonia, 2-aminoethanol or the like in an amount 1.0 to 1.5 molar times the theoretic value for a sulfonic acid group. The hydrolysis reaction may be carried out in the presence of water at 90 to 200° C. for 30 minutes to 3 hours. These reactions can be carried out in succession. Further, after the reactions are completed, purification can be carried out by extraction, washing or the like.

In the present invention, an internal olefin refers to an olefin having a double bond inside the olefin chain as described above.

Component (b) is a sulfosuccinic acid ester or a salt thereof having a hydrocarbon group with 5 or more and 18 or less carbons.

Component (b) is preferably a sulfosuccinic acid diester or a salt thereof having two hydrocarbon groups with 5 or more and 18 or less carbons [hereinafter referred to as component (b1)] from the viewpoints of washing performance, reduction of friction between fibers in wet condition, improvement of softening performance and reduction of wrinkles. Component (b) is preferably a sulfosuccinic acid diester or a salt thereof having two branched hydrocarbon groups with 5 or more and 18 or less carbons, the two hydrocarbon groups having 20 or more carbons in total. The two hydrocarbon groups of this sulfosuccinic acid diester or salt thereof have preferably 30 or less and more preferably 24 or less carbons in total.

Examples of component (b1) include a compound represented by the following general formula (b1), (b1)

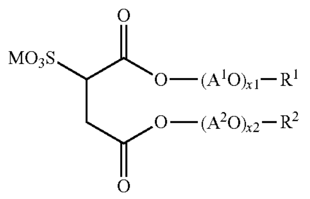

wherein $R^1$ and $R^2$ each represent a hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

$R^1$ and $R^2$ in the general formula (b1) may be the same or different, and each represent a hydrocarbon group with 5 or more and 18 or less carbons. Examples of the hydrocarbon group include an alkyl group and an alkenyl group. $R^1$ and $R^2$ are preferably alkyl groups from the viewpoints of washing performance, reduction of friction between fibers in wet condition, improvement of softening performance and reduction of wrinkles.

The hydrocarbon groups of $R^1$ and $R^2$ in the general formula (b1) have 5 or more, preferably 6 or more, more preferably 8 or more and further preferably 10 or more carbons from the viewpoints of washing performance, reduction of friction between fibers in wet condition, improvement of softening performance and reduction of wrinkles, and 18 or less, preferably 15 or less and more preferably 12 or less carbons from the same viewpoints.

$R^1$ and $R^2$ in the general formula (b1) have preferably 12 or more, more preferably 16 or more and further preferably 20 or more, and preferably 30 or less and more preferably 24 or less carbons in total from the viewpoints of washing performance, reduction of friction between fibers in wet condition, improvement of softening performance and reduction of wrinkles. Here, when the composition contains two or more compounds with different total numbers of carbons in $R^1$ and $R^2$ as component (b1), the total number of carbons in $R^1$ and $R^2$ of the entire component (b1) represents the molar average of the total numbers of carbons in $R^1$ and $R^2$ of those compounds.

The hydrocarbon groups of $R^1$ and $R^2$ in the general formula (b1) may each be either a straight chain or a branched chain, but preferably include a branched chain from the viewpoints of washing performance, reduction of friction between fibers in wet condition, improvement of softening performance and reduction of wrinkles. When the hydrocarbon groups of $R^1$ and $R^2$ are branched chains, they preferably have a side chain with 2 or more carbons and more preferably have a side chain with 3 or more carbons from the viewpoints of washing performance, reduction of friction between fibers in wet condition, improvement of softening performance and reduction of wrinkles. The side chain may have 10 or less, further 8 or less and further 6 or less carbons. Note that when, in the hydrocarbon groups of $R^1$ and $R^2$, the longest arrays of carbons are referred to as the main chains with the carbons bonded to the oxygen atoms (O) in the formula as the first carbons, and the carbon numbers of the main chains are represented as X (X is 3 or more because the carbon numbers of $R^1$ and $R^2$ are 5 or more), hydrocarbon groups bonded to any of the first carbons to the X-1 carbons in the main chains are each referred to as a side chain.

The hydrocarbon groups of $R^1$ and $R^2$ in the general formula (b1) may be either saturated or unsaturated.

Accordingly, at least one of $R^1$ and $R^2$ in the general formula (b1) is preferably a branched chain.

The hydrocarbon groups of $R^1$ and $R^2$ in the general formula (b1) more preferably include a saturated branched hydrocarbon group from the viewpoints of washing performance, reduction of friction between fibers in wet condition, improvement of softening performance and reduction of wrinkles.

Further, when the hydrocarbon groups of $R^1$ and $R^2$ are branched hydrocarbon groups, they may be groups derived from Guerbet alcohols from the viewpoints of washing performance, reduction of friction between fibers in wet condition, improvement of softening performance, reduction of wrinkles and availability.

$R^1$ and $R^2$ in the general formula (b1) each independently represent preferably a branched alkyl group with 8 or more and 12 or less carbons, more preferably a branched alkyl group with 8 or more and 10 or less carbons and further preferably a branched alkyl group with 10 carbons from the viewpoints of washing performance, reduction of friction between fibers in wet condition, improvement of softening performance and reduction of wrinkles.

In the present invention, an open-chain branched hydrocarbon group such as a branched alkyl group or the like includes a hydrocarbon residue left after the removal of a hydroxyl group from a secondary alcohol.

When $R^1$ and $R^2$ each represent a branched alkyl group with 8 or more and 12 or less carbons, the total numbers of carbons constituting their side chains may be the same or different, and are preferably 1 or more and more preferably 2 or more, and preferably 4 or less, more preferably 3 or less and further preferably 3 from the viewpoints of washing performance, reduction of friction between fibers in wet condition, improvement of softening performance and reduction of wrinkles.

In the present invention, the total number of carbons constituting side chains refers to the total of the carbon numbers of all the side chains other than the main chain in one branched alkyl group, and when there is a plurality of side chains, it refers to the total of the carbon numbers of all those side chains.

$R^1$ and $R^2$ may have the same number or different numbers of side chains, and have 1 or more, and preferably 3 or less and more preferably 2 or less side chains from the viewpoints of washing performance, reduction of friction between fibers in wet condition, improvement of softening performance and reduction of wrinkles. $R^1$ and $R^2$ each preferably have 1 side chain from the viewpoints of washing performance, reduction of friction between fibers in wet condition, improvement of softening performance and reduction of wrinkles.

In the present invention, the number of side chains refers to the number of side chains branching off from a main chain, and even if the side chain further has a side chain branching off from the side chain, the number of side chains remains the same. However, while the side chain may further have a side chain branching off from the side chain, the side chain is preferably a straight chain from the viewpoints of washing performance, reduction of friction between fibers in wet condition, improvement of softening performance and reduction of wrinkles.

When $R^1$ and $R^2$ each independently represent a branched alkyl group with 8 or more and 12 or less carbons, $R^1$ and $R^2$ may have the same number or different numbers of branch carbons, and have 1 or more, and preferably 3 or less and further preferably 2 or less branch carbons from the viewpoints of washing performance, reduction of friction between fibers in wet condition, improvement of softening performance and reduction of wrinkles. $R^1$ and $R^2$ each preferably have 1 branch carbon from the viewpoints of washing performance, reduction of friction between fibers in wet condition, improvement of softening performance and reduction of wrinkles. In the present invention, the number of branch carbons refers to the total of the number of tertiary carbon atoms and the number of quaternary carbon atoms in a branched alkyl group.

More preferable aspects of $R^1$ and $R^2$ are branched alkyl groups with 8 or more and 12 or less carbons, wherein in the branched alkyl groups, the main chains each independently have 6, 7 or 8 carbons, the numbers of carbons constituting side chains are each independently preferably 1 or more and 4 or less, more preferably 2 or more and 4 or less, further preferably 2 or more and 3 or less and furthermore preferably 3, and the numbers of side chains are each independently preferably 3 or less, more preferably 2 or less and further preferably 1 from the viewpoints of washing performance, reduction of friction between fibers in wet condition, improvement of softening performance and reduction of wrinkles.

$R^1$ and $R^2$ each represent preferably a branched alkyl group selected from a branched octyl group, a branched decyl group and a branched dodecyl group from the viewpoints of washing performance, reduction of friction between fibers in wet condition, improvement of softening performance and reduction of wrinkles, and more preferably a branched decyl group from the viewpoints of washing performance, reduction of friction between fibers in wet condition, improvement of softening performance and reduction of wrinkles. Examples of the branched octyl group include 2-ethylhexyl group or the like. Examples of the branched decyl group include 2-propylheptyl group, a group derived from a decyl alcohol manufactured by KH Neochem Co., Ltd. or the like, and 2-propylheptyl group is preferable. Examples of the branched dodecyl group include 2-butyloctyl group or the like.

The hydrocarbon groups of $R^1$ and $R^2$ in the general formula (b1) may be the same or different. The case where the hydrocarbon groups of $R^1$ and $R^2$ are different is preferable from the viewpoints of washing performance, reduction of friction between fibers in wet condition, improvement of softening performance and reduction of wrinkles. Further, the case where the hydrocarbon groups of $R^1$ and $R^2$ are the same is preferable from the viewpoints of washing performance, reduction of friction between fibers in wet condition, improvement of softening performance, reduction of wrinkles and quality stability. For example, $R^1$ and $R^2$ in the general formula (b1) may have the same number or different numbers of carbons. The case where $R^1$ and $R^2$ have different numbers of carbons is preferable from the viewpoints of washing performance, reduction of friction between fibers in wet condition, improvement of softening performance and reduction of wrinkles. Further, the case where $R^1$ and $R^2$ have the same number of carbons is preferable from the viewpoints of washing performance, reduction of friction between fibers in wet condition, improvement of softening performance, reduction of wrinkles and quality stability.

When the hydrocarbon groups of $R^1$ and $R^2$ in the general formula (b1) include a branched chain, the degree of branching defined by the formula below is preferably 0.3 or less, more preferably 0.2 or less, further preferably 0.1 or less and furthermore preferably 0.08 or less from the viewpoints of washing performance, reduction of friction between fibers in wet condition, improvement of softening performance and reduction of wrinkles, and preferably 0.01 or more, more preferably 0.02 or more and further preferably 0.04 or more from the viewpoints of washing performance, reduction of friction between fibers in wet condition, improvement of softening performance and reduction of wrinkles.

$$\text{Degree of branching}=[(\text{total number of terminal methyl groups in } R^1 \text{ and } R^2)-2]/(\text{total number of carbons in } R^1 \text{ and } R^2)$$

Note that the degree of branching is an average value that can be measured with $^1$H-NMR.

$A^1O$ and $A^2O$ in the general formula (b1) each represent an alkyleneoxy group with 2 or more and 4 or less carbons, and preferably with 2 or 3 carbons from the viewpoints of washing performance, reduction of friction between fibers in wet condition, improvement of softening performance and reduction of wrinkles. x1 and x2 in the general formula (b1) represent the average numbers of added moles of $A^1O$ and $A^2O$, and each represent a number of 0 or more and 10 or less, and from the viewpoints of washing performance, reduction of friction between fibers in wet condition, improvement of softening performance and reduction of wrinkles, preferably 6 or less, more preferably 4 or less and further preferably 2 or less, and furthermore preferably 0.

M in the general formula (b1) represents a cation. M represents preferably a cation other than a hydrogen ion. Examples of M include, for example, alkali metal ions such as a lithium ion, a sodium ion, a potassium ion or the like, alkaline earth metal ions such as a magnesium ion, a calcium ion, a barium ion or the like, organic ammonium ions such as a triethanolammonium ion, a diethanolammonium ion, a monoethanolammonium ion, a trimethylammonium ion, a monomethylammonium ion or the like, and others.

M represents preferably an alkali metal ion or an alkanol ammonium ion, more preferably a sodium ion, a potassium ion, a triethanolammonium ion, a diethanolammonium ion or a monoethanolammonium ion and further preferably a sodium ion from the viewpoints of washing performance, reduction of friction between fibers in wet condition, improvement of softening performance and reduction of wrinkles.

The friction reducing agent for fibers of the present invention contains component (a) in an amount of preferably 1 mass % or more, more preferably 5 mass % or more, further preferably 10 mass % or more and furthermore preferably 20 mass, or more, and preferably 80 mass % or less, more preferably 60 mass % or less, further preferably 50 mass or less, furthermore preferably 40 mass or less and furthermore preferably 30 mass % or less from the viewpoint of reduction of friction between fibers in wet condition. Note that the content of component (a) in the present invention is based on the amount of component (a) calculated by assuming that component (a) is a potassium salt.

The friction reducing agent for fibers of the present invention contains component (b) in an amount of preferably 1 mass % or more, more preferably 5 mass % or more and further preferably 10 mass % or more, and preferably 60 mass % or less, more preferably 50 mass % or less, further preferably 40 mass % or less, furthermore preferably 30 mass % or less and furthermore preferably 20 mass- or less from the viewpoint of reduction of friction between fibers in wet condition. Note that the content of component (b) in the present invention is based on the amount of component (b) calculated by assuming that component (b) is a sodium salt.

The proportion of the content of component (b) to the total content of components (a) and (b) in the friction reducing agent for fibers of the present invention is 20 mass % or more, preferably 25 mass % or more and more preferably 50 mass % or more, and less than 100 mass %, preferably 80 mass % or less and more preferably 75 mass or less from the viewpoint of reduction of friction between fibers in wet condition. In the present invention, a proportion expressed as a mass percentage is a predetermined proportion value expressed as a percentage (the same applies hereinafter).

The friction reducing agent for fibers of the present invention can contain, as an optional component other than components (a) and (b), for example, a pH adjuster, a fragrance, an anti-bacterial agent, a bleaching agent, a bleach activator, a defoamer, a fragrance capsule, an enzyme, a polymer, silicone or the like. The friction reducing agent for fibers of the present invention may be a composition containing components (a) and (b).

Further, the friction reducing agent for fibers of the present invention preferably contains the surfactant of component (x) and the solvent of component (c) described later from the viewpoint of reduction of friction between fibers in wet condition. The specific examples or preferable examples of components (x) and (c) are the same as those in the detergent composition for fibers of the present invention.

When the friction reducing agent for fibers of the present invention contains component (x), the reducing agent contains component (x) in an amount of preferably 0.01 mass % or more, more preferably 0.1 mass % or more, further preferably 1 mass % or more, furthermore preferably 5 mass % or more and furthermore preferably 10 mass % or more, and preferably 50 mass % or less, more preferably 40 mass % or less, further preferably 30 mass % or less and furthermore preferably 20 mass % or less from the viewpoint of reduction of friction between fibers in wet condition.

Further, when the friction reducing agent for fibers of the present invention contains component (c), the reducing agent contains component (c) in an amount of preferably 0.1 mass % or more, more preferably 1 mass % or more, further preferably 5 mass % or more, furthermore preferably 10 mass % or more and furthermore preferably 15 mass % or more, and preferably 60 mass % or less, more preferably 50 mass % or less and further preferably 25 mass % or less from the viewpoint of reduction of friction between fibers in wet condition.

The friction reducing agent for fibers of the present invention can be applied to fibers, for example, as a treatment liquid containing component (a), component (b) and water. This treatment liquid can further contain component (x) or component (c).

The present invention discloses use as a friction reducing agent for fibers of an agent containing components (a) and (b), wherein a proportion of a content of component (b) to a total content of components (a) and (b) is 20 mass % or more and less than 100 mass %. The matters stated in the friction reducing agent for fibers, the method for reducing friction between fibers, the detergent composition for fibers and the method for treating a textile product of the present invention can be appropriately applied to the use of the present invention. The specific examples, preferable aspects or the like of components (a) and (b) in the use of the present invention are also the same as those in the friction reducing agent for fibers or the like of the present invention.

The method for reducing friction between fibers of the present invention includes bringing components (a) and (b) into contact with the fibers in such amounts that a proportion of an amount of component (b) to a total amount of components (a) and (b) is 20 mass % or more and less than 100 mass %.

The matters stated in the friction reducing agent for fibers, the detergent composition for fibers and the method for treating a textile product of the present invention can be appropriately applied to the method for reducing friction between fibers of the present invention. The specific examples, preferable aspects or the like of components (a) and (b) in the method for reducing friction between fibers of the present invention are also the same as those in the friction reducing agent for fibers or the like of the present invention. The method for reducing friction between fibers of the present invention can be carried out by using the friction reducing agent for fibers of the present invention.

In the method for reducing friction between fibers of the present invention, for example, a treatment liquid containing component (a), component (b) and water can be brought into contact with the fibers. This treatment liquid can further contain component (x) or component (c). Further, this treatment liquid may be obtained by mixing the friction reducing agent for fibers of the present invention with water.

Target fibers of the method for reducing friction between fibers of the present invention may be textile products such as clothing or the like.

In the method for reducing friction between fibers of the present invention, for example, component (a) can be brought into contact with the fibers in an amount of 0.001% o.w.f. or more and further 0.01% o.w.f. or more, and 10% o.w.f. or less and further 1% o.w.f. or less. Here, "% o.w.f." stands for "% on the weight of fabric," and means the percentage of the mass of a component (component (a) or the like) relative to the mass of fibers.

Further, in the method for reducing friction between fibers of the present invention, for example, component (b) can be brought into contact with the fibers in an amount of 0.0001% o.w.f. or more and further 0.001% o.w.f. or more, and 10% o.w.f. or less and further 1% o.w.f. or less.

The friction reducing agent for fibers of the present invention may be used such that component (a) and/or component (b) is at a percentage o.w.f. falling within the above range.

<Detergent Composition for Fibers>

The detergent composition for fibers of the present invention contains components (a) and (b), wherein a proportion of a content of component (b) to a total content of components (a) and (b) is 20 mass % or more and less than 100%.

The matters stated in the friction reducing agent for fibers, the method for reducing friction between fibers and the method for treating a textile product of the present invention can be appropriately applied to the detergent composition for fibers of the present invention. The specific examples, preferable aspects or the like of components (a) and (b) in the detergent composition for fibers of the present invention are also the same as those in the friction reducing agent for fibers, the method for reducing friction between fibers and the method for treating a textile product of the present invention.

The detergent composition for fibers of the present invention may be a composition containing components (a) and (b) as a friction reducing agent for fibers.

The detergent composition for fibers of the present invention contains component (a) in an amount of preferably 1 mass % or more, more preferably 3 mass % or more, further preferably 5 mass % or more, furthermore preferably 10 mass % or more and furthermore preferably 15 mass % or more, and preferably 90 mass % or less, more preferably 80 mass % or less, further preferably 50 mass' or less, furthermore preferably 40 mass % or less, furthermore preferably 30 mass % or less and furthermore preferably 20 mass % or less from the viewpoints of improvement of washing performance, improvement of softening performance and reduction of wrinkles.

The detergent composition for fibers of the present invention contains component (b) in an amount of preferably 1 mass % or more, more preferably 3 mass % or more, further preferably 5 mass % or more and furthermore preferably 10 mass % or more, and preferably 80 mass % or less, more preferably 60 mass % or less, further preferably 50 mass % or less, furthermore preferably 40 mass % or less, furthermore preferably 30 mass % or less and furthermore preferably 20 mass % or less from the viewpoints of improvement of washing performance, improvement of softening performance and reduction of wrinkles.

The proportion of the content of component (b) to the total content of components (a) and (b) in the detergent composition for fibers of the present invention is 20 mass % or more, preferably 25 mass % or more and more preferably 50 mass % or more, and less than 100 mass %, preferably 80 mass % or less and more preferably 75 mass % or less from the viewpoints of improvement of washing performance, improvement of softening performance and reduction of wrinkles.

The friction reducing agent for fibers and/or the detergent composition for fibers of the present invention can contain a surfactant other than components (a) and (b) [hereinafter referred to as component (x)].

Examples of component (x) include one or more surfactants selected from an anionic surfactant other than components (a) and (b), a nonionic surfactant, a cationic surfactant and an amphoteric surfactant.

From the viewpoint of formulation or improvement of washing performance, improvement of softening performance and reduction of wrinkles, the anionic surfactant other than components (a) and (b) is preferably one or more compounds selected from compound (x1-1) represented by the following general formula (x1-1) [hereinafter referred to as component (x1-1)], compound (x1-2) represented by the following general formula (x1-2) [hereinafter referred to as component (x1-2)] and compound (x1-3) represented by the following general formula (x1-3) [hereinafter referred to as component (x1-3)], $$R^{1x}—O—[(PO)_{m1}(EO)_{n1}]\text{-}SO_3M^{1x} \quad (x1\text{-}1)$$

wherein in the formula (x1-1), $R^{1x}$ represents an alkyl group with 8 or more and 22 or less carbons, in which a carbon atom bonded to the oxygen atom is a primary carbon atom, PO represents a propyleneoxy group, EO represents an ethyleneoxy group, EO and PO are bonded in blocks or bonded at random, PO and EO are bonded in an arbitrary order, m1 and n1 represent average numbers of added moles, where m1 is 0 or more and 5 or less and n1 is 0 or more and 16 or less, and $M^{1x}$ represents a hydrogen atom, an alkali metal, an alkaline earth metal (½ atom), ammonium or an organic ammonium, $$R^{2x}—B—SO_3M^{2x} \quad (x1\text{-}2)$$

wherein in the formula (x1-2), $R^{2x}$ represents an alkyl group with 9 or more and 21 or less carbons, B represents a benzene ring, a carbon atom of $R^{2x}$ bonded to a carbon atom of B is a secondary carbon atom, $M^{2x}$ represents a hydrogen atom, an alkali metal, an alkaline earth metal (½ atom), ammonium or an organic ammonium, and a sulfonic acid group is bonded in an ortho, meta or para position relative to $R^{2x}$ bonded to B, and $$R^{3x}—CH(SO_3M^{3x})COOR^{4x} \quad (x1\text{-}3)$$

wherein in the formula (x1-3), $R^{3x}$ represents an alkyl group with 6 or more and 20 or less carbons, $R^{4x}$ represents an alkyl group with 1 or more and 6 or less carbons, and $M^{3x}$ represents a hydrogen atom, an alkali metal, an alkaline earth metal (½ atom), ammonium or an organic ammonium.

$R^{1x}$ in the general formula (x1-1) represents an alkyl group with preferably 9 or more, more preferably 10 or more and further preferably 12 or more, and preferably 18 or less, more preferably 16 or less and further preferably 14 or less carbons from the viewpoint of formulation or improvement of washing performance, improvement of softening performance and reduction of wrinkles. $R^1$ is preferably a straight alkyl group.

m1 in the general formula (x1-1) is preferably 4 or less, more preferably 3 or less and further preferably 2 or less from the viewpoint of formulation or improvement of washing performance, improvement of softening performance and reduction of wrinkles.

n1 in the general formula (x1-1) is preferably 0.5 or more, more preferably 1 or more and further preferably 2 or more, and preferably 10 or less, more preferably 5 or less and further preferably 4 or less from the viewpoint of formulation or improvement of washing performance, improvement of softening performance and reduction of wrinkles.

$M^{1x}$ in the general formula (x1-1) is preferably a hydrogen atom, an alkali metal such as sodium, potassium or the like, an alkaline earth metal (½ atom) such as magnesium, calcium or the like, or an organic ammonium from the viewpoint of formulation or improvement of washing performance, improvement of softening performance and reduction of wrinkles. The organic ammonium salt may be a salt with an amine used for a pH adjuster. Mix represents more preferably an alkali metal such as sodium, potassium or the like or an alkanol ammonium such as monoethanolammonium, diethanolammonium or the like and further preferably sodium.

Component (x1-1) is preferably a polyoxyalkylene alkyl ether sulfate sodium salt in which the alkyl group has 12 or more and 14 or less carbons, the average number of added moles of a propyleneoxy group is 0 or more and 4 or less, and the average number of added moles of an ethyleneoxy group is 1 or more and 4 or less from the viewpoint of formulation or improvement of washing performance, improvement of softening performance and reduction of wrinkles. In other words, component (x1-1) is preferably a compound of the general formula (x1-1) in which $R^{1x}$ represents an alkyl group with 12 or more and 14 or less carbons, m1 is 0 or more and 4 or less, n1 is 1 or more and 4 or less, and $M^{1x}$ represents sodium.

$R^{2x}$ in the general formula (x1-2) represents an alkyl group with 9 or more, preferably 10 or more and more preferably 11 or more, and preferably 18 or less, more preferably 16 or less and further preferably 14 or less carbons from the viewpoint of formulation or improvement of washing performance, improvement of softening performance and reduction of wrinkles.

$M^{2x}$ in the general formula (x1-2) represents preferably a hydrogen atom, an alkali metal such as sodium, potassium or the like, an alkaline earth metal (½ atom) such as magnesium, calcium or the like, or an organic ammonium. The organic ammonium salt may be a salt with an amine used for a pH adjuster. $M^{2x}$ represents more preferably an alkali metal such as sodium, potassium or the like or an alkanol ammonium such as monoethanolammonium, diethanolammonium or the like and further preferably sodium.

$R^{3x}$ in the general formula (x1-3) represents an alkyl group with preferably 8 or more and more preferably 10 or more, and preferably 18 or less and more preferably 16 or less carbons from the viewpoint of formulation or improvement of washing performance, improvement of softening performance and reduction of wrinkles.

$R^{4x}$ in the general formula (x1-3) represents an alkyl group with preferably 1 or more, and preferably 5 or less and more preferably 4 or less carbons from the viewpoint of formulation or improvement of washing performance, improvement of softening performance and reduction of wrinkles.

$M^{3x}$ in the general formula (x1-3) is preferably a hydrogen atom, an alkali metal such as sodium, potassium or the like, an alkaline earth metal (½ atom) such as magnesium, calcium or the like, or an organic ammonium salt from the viewpoint of formulation or improvement of washing performance, improvement of softening performance and reduction of wrinkles. The organic ammonium salt may be a salt with an amine used for a pH adjuster. $M^{3x}$ represents more preferably an alkali metal such as sodium, potassium or the like or an alkanol ammonium such as monoethanolammonium, diethanolammonium or the like and further preferably sodium.

From the viewpoint of formulation or improvement of washing performance, improvement of softening performance and reduction of wrinkles, examples of the nonionic surfactant can include a nonionic surfactant represented by the following general formula (x2), $$R^{5x}(CO)_{m2}O\text{-}(AO)_{n2}—R^{6x} \quad (x2)$$

wherein $R^{5x}$ represents an aliphatic hydrocarbon group with 9 or more and 18 or less carbons, $R^{6x}$ represents a hydrogen atom or a methyl group, CO represents a carbonyl group, m2 is a number of 0 or 1, AO group is one or more groups selected from an ethyleneoxy group and a propyleneoxy group, and n2 represents an average number of added moles, which is a number of 1 or more and 70 or less.

$R^{5x}$ in the general formula (x2) represents an aliphatic hydrocarbon group with 9 or more and 18 or less carbons. $R^{5x}$ has 9 or more, preferably 10 or more and more preferably 12 or more, and 18 or less, preferably 16 or less and more preferably 14 or less carbons from the viewpoint of formulation or improvement of washing performance, improvement of softening performance and reduction of wrinkles.

The aliphatic hydrocarbon group of $R^{5x}$ is preferably a group selected from an alkyl group and an alkenyl group.

m2 in the general formula (x2) is preferably 0 from the viewpoint of formulation or improvement of washing performance, improvement of softening performance and reduction of wrinkles.

$R^{6x}$ in the general formula (x2) is preferably a hydrogen atom from the viewpoint of formulation or improvement of washing performance, improvement of softening performance and reduction of wrinkles.

AO group in the general formula (x2) is one or more groups selected from an ethyleneoxy group and a propyleneoxy group. When an ethyleneoxy group and a propyleneoxy group are included, the ethyleneoxy group and the propyleneoxy group may be either bonded in blocks or bonded at random. AO group is preferably a group including an ethyleneoxy group from the viewpoint of preventing a fiber softening effect by components (a) and (b) from being impaired. Further, the ethyleneoxy group and the propyleneoxy group are bonded in an arbitrary order.

n2 in the general formula (x2) represents an average number of added moles, which is a number of 1 or more and 70 or less. n2 is 1 or more, preferably 5 or more and more preferably 10 or more, and 70 or less, preferably 60 or less, more preferably 50 or less, further preferably 40 or less, furthermore preferably 30 or less and furthermore preferably 25 or less from the viewpoint of formulation, improvement of washing performance, improvement of softening performance and reduction of wrinkles or stable formulation with components (a) and (b).

From the viewpoint of formulation or improvement of washing performance, improvement of softening performance and reduction of wrinkles, a more preferable compound as the nonionic surfactant of the present invention is a polyoxyethylene (polyoxypropylene) alkyl ether in which the average degree of polymerization (or sometimes also referred to as the average number of added moles) of the ethyleneoxy group (hereinafter sometimes referred to as EO group) is 1 or more, preferably 5 or more and more preferably 10 or more, and 70 or less, preferably 50 or less and further preferably 25 or less, the average degree of polymerization (or sometimes also referred to as the average number of added moles) of the propyleneoxy group (hereinafter sometimes also referred to as PO group) is 0 or more and 5 or less and preferably 4 or less, EO group and PO group are bonded in blocks or bonded at random, preferably bonded in blocks, and from the viewpoint of formulation, improvement of washing performance, improvement of softening performance and reduction of wrinkles or stability, more preferably bonded in blocks in the order of EOPOEO or the order of POEO with respect to the alkyl ether (for example, $R^{5x}$—O in the general formula (x2)), and the alkyl group is derived from a straight primary or secondary alcohol with 12 or more and 18 or less, more preferably 12 or 14 and further preferably 12 carbons.

Examples of the cationic surfactant include cationic surfactants that are tertiary amine salts and cationic surfactants that are quaternary ammonium salts.

Examples of the amphoteric surfactant include betaine-based amphoteric surfactants and amine oxide-type amphoteric surfactants.

Component (x) is preferably one or more surfactants selected from the anionic surfactant other than components (a) and (b) and the nonionic surfactant.

When the detergent composition for fibers of the present invention contains component (x), the composition contains component (x) in an amount of preferably 0.01 mass % or more, more preferably 0.1 mass % or more, further preferably 1 mass % or more and furthermore preferably 5 mass % or more, and preferably 50 mass % or less, more preferably 25 mass % or less and further preferably 15 mass % or less from the viewpoints of improvement of washing performance, improvement of softening performance and reduction of wrinkles.

A proportion of a total amount of components (a) and (b) to a total amount of surfactants in the detergent composition for fibers of the present invention is preferably 10 mass % or more, more preferably 20 mass % or more, further preferably 30 mass, or more and furthermore preferably 40 mass, or more, and preferably 100 mass % or less, more preferably 90 mass % or less, further preferably 80 mass or less, furthermore preferably 70 mass or less, furthermore preferably 60 mass % or less and furthermore preferably 50 mass % or less from the viewpoints of improvement of washing performance, improvement of softening performance and reduction of wrinkles. The total amount of surfactants may be the total content of components (a), (b) and (x) in the composition. The detergent composition for fibers of the present invention may be a composition containing a surfactant, wherein the composition contains as the surfactant components (a) and (b) at the predetermined proportions, and the proportion of the total content of components (a) and (b) to the content of surfactants falls within the above range.

From the viewpoints of improvement of washing performance, improvement of softening performance and reduction of wrinkles, the friction reducing agent for fibers and/or the detergent composition for fibers of the present invention preferably further contains the following component (c) from the viewpoint of formulation or improvement of washing performance, improvement of softening performance and reduction of wrinkles, component (c): a solvent having a hydroxyl group.

Component (c) is preferably one or more organic solvents selected from the following components (c1) to (c4), component (c1): a monohydric alcohol with 2 or more and 6 or less carbons, component (c2): a dihydric or more and dodecahydric or less alcohol with 2 or more and 12 or less carbons, component (c3): an organic solvent having a hydrocarbon group with 1 or more and 8 or less carbons (excluding an aromatic group that may be partially substituted), an ether group and a hydroxyl group, and component (c4): an organic solvent having an aromatic group that may be partially substituted, an ether group and a hydroxyl group.

Examples of component (c1) include, for example, ethanol, 1-propanol, 2-propanol and phenol.

Examples of component (c2) include, for example, ethylene glycol, propylene glycol, butylene glycol, hexylene glycol, diethylene glycol, triethylene glycol, tetraethylene glycol, dipropylene glycol, tripropylene glycol and glycerin.

Examples of component (c3) include, for example, diethylene glycol monomethyl ether, triethylene glycol monomethyl ether, diethylene glycol monoethyl ether, diethylene glycol monobutyl ether (which is also referred to as butyldiglycol), dipropylene glycol monomethyl ether, dipropylene glycol monoethyl ether, tripropylene glycol monomethyl ether, 1-methoxy-2-propanol, 1-ethoxy-2-propanol, 1-methylglycerin ether, 2-methylglycerin ether, 1,3-dimethylglycerin ether, 1-ethylglycerin ether, 1,3-diethylglycerin ether, 1-pentylglyceryl ether, 2-pentylglyceryl ether, 1-octylglyceryl ether and 2-ethylhexyglyceryl ether.

Examples of component (c4) include, for example, 2-phenoxyethanol (which is also referred to as phenylglycol), diethylene glycol monophenyl ether, triethylene glycol monophenyl ether, a polyethylene glycol monophenyl ether of an average molar weight of about 480, 2-benzyloxyethanol and diethylene glycol monobenzyl ether.

Component (c) is preferably one or more organic solvents having a hydroxyl group selected from components (c2), (c3) and (c4) listed above from the viewpoint of formulation or improvement of washing performance, improvement of softening performance and reduction of wrinkles.

When the detergent composition for fibers of the present invention contains component (c), the composition contains component (c) in an amount of preferably 0.1 mass or more, more preferably 1 mass % or more and further preferably 10 mass % or more, and preferably 60 mass % or less, more preferably 50 mass % or less and further preferably 25 mass % or less from the viewpoint of formulation or improvement of washing performance, improvement of softening performance and reduction of wrinkles.

The detergent composition for fibers of the present invention can contain, as a further optional component, for example, a pH adjuster, a fragrance, an anti-bacterial agent, a bleaching agent, a bleach activator, a defoamer, a fragrance capsule, an enzyme, a polymer, silicone or the like. As the pH adjuster, for example, an alkali agent such as monoethanolamine or the like or an acid agent such as citric acid or the like can be used.

The detergent composition for fibers of the present invention preferably contains water. The composition may be a liquid composition containing water. Water that has been moderately purified and includes no impurities is preferably used as the water. Well water or industrial water can also be used. The water is preferably tap water or purified water, for example, ion exchange water. The detergent composition for fibers of the present invention contains water in an amount of preferably 50 mass % or more, more preferably 60 mass % or more and further preferably 70 mass % or more, and preferably 95 mass % or less, preferably 90 mass % or less and more preferably 85 mass % or less. The content of water may be the balance of the composition excluding the total content of components (a) and (b) and an optional component. The friction reducing agent for fibers of the present invention can also contain water.

The friction reducing agent for fibers and the detergent composition for fibers of the present invention have a pH at 25° C. measured by the following method of preferably 4 or more and more preferably 5 or more, and preferably 12 or less and more preferably 11 or less.

[pH Measurement Method]

A composite electrode for pH measurements (manufactured by HORIBA, Ltd., glass slide-in sleeve type) is connected to a pH meter (pH/ion meter F-23 manufactured by HORIBA, Ltd.), and the power is turned on. As the internal solution for the pH electrode, a saturated aqueous potassium chloride solution (3.33 mol/L) is used. Next, a pH 4.01 standard solution (phthalate standard solution), a pH 6.86 standard solution (neutral phosphate standard solution) and a pH 9.18 standard solution (borate standard solution) are each placed in a 100 mL-beaker, and immersed in a constant temperature bath at 25° C. for 30 minutes. The electrode for pH measurements is immersed in the standard solutions adjusted to a constant temperature for 3 minutes to perform a calibration operation in the order of pH 6.86, pH 9.18 and pH 4.01. A sample to be measured (the friction reducing agent for fibers or the detergent composition for fibers) is adjusted to 25° C., the electrode of the pH meter is immersed in the sample, and the pH 1 minute later is measured.

<Method for Treating Textile Product>

The method for washing a textile product of the present invention is a method for treating a textile product including, washing the textile product with a washing liquid obtained by mixing components (a) and (b) with water, and thereafter rinsing the textile product with water, wherein a proportion of a content of component (b) in the washing liquid to a total content of components (a) and (b) in the washing liquid is 20 mass % or more and less than 100 mass %.

The matters stated in the friction reducing agent for fibers, the method for reducing friction between fibers and the detergent composition for fibers of the present invention can be appropriately applied to the method for treating a textile product of the present invention. The specific examples, preferable aspects or the like of components (a) and (b) in the method for treating a textile product of the present invention are also the same as those in the friction reducing agent for fibers or the like of the present invention. The method for treating a textile product of the present invention can be carried out by using the friction reducing agent for fibers or the detergent composition for fibers of the present invention. Further, the washing liquid may have a pH described in the detergent composition for fibers of the present invention. Further, the washing liquid can also contain component (x) or component (c). The textile product can be washed and rinsed in conformance with publicly-known methods.

A concentration of component (a) in the washing liquid is preferably 0.0001 mass % or more and more preferably 0.0005 mass % or more, and preferably 10 mass % or less and more preferably 1 mass, or less from the viewpoints of improvement of washing performance, improvement of softening performance and reduction of wrinkles. The washing liquid is preferably prepared by diluting the detergent composition for fibers of the present invention with water such that the content of component (a) falls within this range. A specific dilution ratio may be preferably 500 times or more and more preferably 800 times or more, and preferably 5000 times or less and more preferably 3000 times or less from the viewpoints of washing performance and finishing performance (softening performance and wrinkle reducing performance).

In the method for treating a textile product of the present invention, for example, component (a) can be brought into contact with fibers in an amount of 0.001% o.w.f. or more and further 0.01% o.w.f. or more, and 10% o.w.f. or less and further 1% o.w.f. or less. Here, "% o.w.f." stands for "% on the weight of fabric," and means the percentage of the mass of a component (component (a) or the like) relative to the mass of fibers.

Further, in the method for treating a textile product of the present invention, for example, component (b) can be brought into contact with fibers in an amount of 0.0001% o.w.f. or more and further 0.001% o.w.f. or more, and 10% o.w.f. or less and further 1% o.w.f. or less.

The method for treating a textile product of the present invention can be carried out by using, for example, a washing machine for home use or a washing machine for commercial use. As conditions therefor, commonly used temperature, time, bath ratio or the like can be employed. The method for treating a textile product of the present invention can reduce frictional force between fibers in wet condition. This makes it easier to remove textile products after washing. Further, washing damage to textile products is reduced, and wrinkles in textile products at the end of washing are reduced.

In addition to the above embodiments, the present invention discloses the aspects below.

<1>

A friction reducing agent for fibers containing the following components (a) and (b), component (a): an internal olefin sulfonate with 17 or more and 24 or less carbons, and component (b): a sulfosuccinic acid ester or a salt thereof having a hydrocarbon group with 5 or more and 18 or less carbons, wherein a proportion of a content of component (b) to a total content of components (a) and (b) is 20 mass % or more and less than 100 mass.

<2>

The friction reducing agent for fibers according to <1>, wherein component (a) has preferably 18 or more, and preferably 22 or less and more preferably 20 or less carbons.

<3>

The friction reducing agent for fibers according to <1> or <2>, wherein component (b) is a sulfosuccinic acid diester or a salt thereof having two branched hydrocarbon groups with 5 or more and 18 or less carbons.

<4>

The friction reducing agent for fibers according to any of <1> to <3>, wherein component (b) is a sulfosuccinic acid diester or a salt thereof having two branched hydrocarbon groups with 5 or more and 18 or less carbons, the two hydrocarbon groups having 20 or more carbons in total.

<5>

The friction reducing agent for fibers according to <1> or <2>, wherein component (b) is a compound represented by the following general formula (b1), (b1)

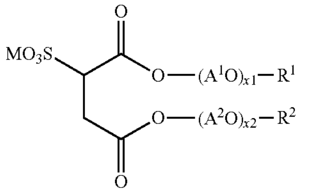

wherein $R^1$ and $R^2$ each represent a hydrocarbon group with 5 or more and 18 or less carbons and preferably a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<6>

The friction reducing agent for fibers according to <5>, wherein the hydrocarbon groups of $R^1$ and $R^2$ in the general formula (b1) are alkyl groups or alkenyl groups.

<7>

The friction reducing agent for fibers according to <5> or <6>, wherein the hydrocarbon groups of $R^1$ and $R^2$ in the general formula (b1) have preferably 6 or more, more preferably 8 or more and further preferably 10 or more, and preferably 15 or less and more preferably 12 or less carbons.

<8>

The friction reducing agent for fibers according to any of <5> to <7>, wherein the branched hydrocarbon groups of $R^1$ and $R^2$ in the general formula (b1) have a side chain with preferably 2 or more and more preferably 3 or more, and preferably 10 or less, more preferably 8 or less and further preferably 6 or less carbons, and $R^1$ and $R^2$ in the general formula (b1) are preferably branched alkyl groups with 8 or more and 12 or less carbons, more preferably branched alkyl groups with 10 or more and 12 or less carbons and further preferably branched alkyl groups with 10 carbons.

<9>

The friction reducing agent for fibers according to any of <5> to <8>, wherein $R^1$ and $R^2$ in the general formula (b1) each represent preferably a group selected from 2-ethylhexyl group and 2-propylheptyl group and more preferably 2-propylheptyl group.

<10>

The friction reducing agent for fibers according to any of <5> to <9>, wherein $A^1O$ and $A^2O$ in the general formula (b1) each represent an alkyleneoxy group with 2 or more and 4 or less carbons and preferably with 2 or 3 carbons, and x1 and x2 in the general formula (b1) represent the average numbers of added moles of $A^1O$ and $A^2O$, and each represent a number of 0 or more and 10 or less, preferably 6 or less, more preferably 4 or less and further preferably 2 or less, and furthermore preferably 0.

<11>

The friction reducing agent for fibers according to any of <5> to <10>, wherein M in the general formula (b1) represents preferably an alkali metal ion or an alkanol ammonium ion, more preferably a sodium ion, a potassium ion, a triethanolammonium ion, a diethanolammonium ion or a monoethanolammonium ion and further preferably a sodium ion.

<12>

The friction reducing agent for fibers according to any of <1> to <11>, wherein a content of component (a) is preferably 1 mass % or more, more preferably 5 mass % or more, further preferably 10 mass % or more and furthermore preferably 20 mass % or more, and preferably 80 mass % or less, more preferably 60 mass % or less, further preferably 50 mass % or less, furthermore preferably 40 mass % or less and furthermore preferably 30 mass % or less.

<13>

The friction reducing agent for fibers according to any of <1> to <12>, wherein the content of component (b) is preferably 1 mass % or more, more preferably 5 mass % or more and further preferably 10 mass % or more, and preferably 60 mass % or less, more preferably 50 mass, or less, further preferably 40 mass % or less, furthermore preferably 30 mass % or less and furthermore preferably 20 mass % or less.

<14>

The friction reducing agent for fibers according to any of <1> to <13>, wherein the proportion of the content of component (b) to the total content of components (a) and (b) is preferably 25 mass % or more and more preferably 50 mass % or more, and preferably 80 mass % or less and more preferably 75 mass % or less.

<15>

A method for reducing friction between fibers including, bringing the following components (a) and (b) into contact with the fibers in such amounts that a proportion of an amount of component (b) to a total amount of components (a) and (b) is 20 mass % or more and less than 100 mass, component (a): an internal olefin sulfonate with 17 or more and 24 or less carbons, and component (b): a sulfosuccinic acid ester or a salt thereof having a hydrocarbon group with 5 or more and 18 or less carbons.

<16>

The method for reducing friction between fibers according to <15>, wherein component (a) has preferably 18 or more, and preferably 22 or less and more preferably 20 or less carbons.

<17>

The method for reducing friction between fibers according to <15> or <16>, wherein component (b) is a sulfosuccinic acid diester or a salt thereof having two branched hydrocarbon groups with 5 or more and 18 or less carbons, the two hydrocarbon groups having 20 or more carbons in total.

<18>

The method for reducing friction between fibers according to <15> or <16>, wherein component (b) is a compound represented by the following general formula (b1), (b1)

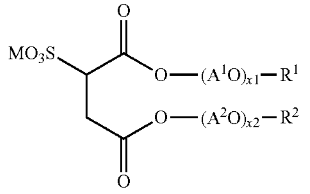

wherein $R^1$ and $R^2$ each represent a hydrocarbon group with 5 or more and 18 or less carbons and preferably a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<19>

The method for reducing friction between fibers according to <18>, wherein the branched hydrocarbon groups of $R^1$ and $R^2$ in the general formula (b1) have a side chain with preferably 2 or more and more preferably 3 or more, and preferably 10 or less, more preferably 8 or less and further preferably 6 or less carbons, and $R^1$ and $R^2$ in the general formula (b1) are preferably branched alkyl groups with 8 or more and 12 or less carbons, more preferably branched alkyl groups with 10 or more and 12 or less carbons and further preferably branched alkyl groups with 10 carbons.

<20>

The method for reducing friction between fibers according to <18> or <19>, wherein $R^1$ and $R^2$ in the general formula (b1) each represent preferably a group selected from 2-ethylhexyl group and 2-propylheptyl group and more preferably 2-propylheptyl group.

<21>

The method for reducing friction between fibers according to any of <18> to <21>, wherein the proportion of the content of component (b) to the total content of components (a) and (b) is preferably 25 mass % or more and more preferably 50 mass % or more, and preferably 80 mass % or less and more preferably 75 mass % or less.

<22>

A detergent composition for fibers containing the following components (a) and (b), component (a): an internal olefin sulfonate with 17 or more and 24 or less carbons, and component (b): a sulfosuccinic acid ester or a salt thereof having a hydrocarbon group with 5 or more and 18 or less carbons, wherein a proportion of a content of component (b) to a total content of components (a) and (b) is 20 mass % or more and less than 100 mass.

<23>

The detergent composition for fibers according to <22>, wherein component (a) has preferably 18 or more, and preferably 22 or less and more preferably 20 or less carbons.

<24>

The detergent composition for fibers according to <22> or <23>, wherein component (b) is a sulfosuccinic acid diester or a salt thereof having two branched hydrocarbon groups with 5 or more and 18 or less carbons.

<25>

The detergent composition for fibers according to any of <22> to <24>, wherein component (b) is a sulfosuccinic acid diester or a salt thereof having two branched hydrocarbon groups with 5 or more and 18 or less carbons, the two hydrocarbon groups having 20 or more carbons in total.

<26>

The detergent composition for fibers according to <22> or <23>, wherein component (b) is a compound represented by the following general formula (b1), (b1)

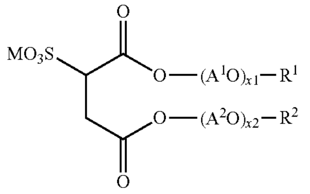

wherein $R^1$ and $R^2$ each represent a hydrocarbon group with 5 or more and 18 or less carbons and preferably a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<27>

The detergent composition for fibers according to <26>, wherein the hydrocarbon groups of $R^1$ and $R^2$ in the general formula (b1) are alkyl groups or alkenyl groups.

<28>

The detergent composition for fibers according to <26> or <27>, wherein the hydrocarbon groups of $R^1$ and $R^2$ in the general formula (b1) have preferably 6 or more, more preferably 8 or more and further preferably 10 or more, and preferably 15 or less and more preferably 12 or less carbons.

<29>

The detergent composition for fibers according to any of <26> to <28>, wherein the branched hydrocarbon groups of $R^1$ and $R^2$ in the general formula (b1) have a side chain with preferably 2 or more and more preferably 3 or more, and preferably 10 or less, more preferably 8 or less and further preferably 6 or less carbons, and $R^1$ and $R^2$ in the general formula (b1) are preferably branched alkyl groups with 8 or more and 12 or less carbons, more preferably branched alkyl groups with 10 or more and 12 or less carbons and further preferably branched alkyl groups with 10 carbons.

<30>

The detergent composition for fibers according to any of <26> to <29>, wherein $R^1$ and $R^2$ in the general formula (b1) each represent preferably a group selected from 2-ethylhexyl group and 2-propylheptyl group and more preferably 2-propylheptyl group.

<31>

The detergent composition for fibers according to any of <26> to <30>, wherein $A^1O$ and $A^2O$ in the general formula (b1) each represent an alkyleneoxy group with 2 or more and 4 or less carbons and preferably with 2 or 3 carbons, and x1 and x2 in the general formula (b1) represent the average numbers of added moles of $A^1O$ and $A^2O$, and each represent a number of 0 or more and 10 or less, preferably 6 or less, more preferably 4 or less and further preferably 2 or less, and furthermore preferably 0.

<32>

The detergent composition for fibers according to any of <26> to <31>, wherein M in the general formula (b1) represents preferably an alkali metal ion or an alkanol ammonium ion, more preferably a sodium ion, a potassium ion, a triethanolammonium ion, a diethanolammonium ion or a monoethanolammonium ion and further preferably a sodium ion.

<33>

The detergent composition for fibers according to any of <22> to <32>, wherein a content of component (a) is preferably 1 mass % or more, more preferably 5 mass % or more, further preferably 10 mass % or more and furthermore preferably 20 mass % or more, and preferably 80 mass % or less, more preferably 60 mass % or less, further preferably 50 mass % or less, furthermore preferably 40 mass % or less and furthermore preferably 30 mass % or less.

<34>

The detergent composition for fibers according to any of <22> to <33>, wherein the content of component (b) is preferably 1 mass, or more, more preferably 5 mass % or more and further preferably 10 mass % or more, and preferably 60 mass % or less, more preferably 50 mass % or less, further preferably 40 mass % or less, furthermore preferably 30 mass % or less and furthermore preferably 20 mass % or less.

<35>

The detergent composition for fibers according to any of <22> to <34>, wherein the proportion of the content of component (b) to the total content of components (a) and (b) is preferably 25 mass % or more and more preferably 50 mass % or more, and preferably 80 mass % or less and more preferably 75 mass % or less.

<36>

The detergent composition for fibers according to any of <22> to <35>, further containing the following component (c), component (c): a solvent having a hydroxyl group.

<37>

The detergent composition for fibers according to <36>, wherein component (c) is one or more organic solvents selected from the following components (c1) to (c4), component (c1): a monohydric alcohol with 2 or more and 6 or less carbons, component (c2): a dihydric or more and dodecahydric or less alcohol with 2 or more and 12 or less carbons, component (c3): an organic solvent having a hydrocarbon group with 1 or more and 8 or less carbons (excluding an aromatic group that may be partially substituted), an ether group and a hydroxyl group, and component (c4): an organic solvent having an aromatic group that may be partially substituted, an ether group and a hydroxyl group.

<38>

The detergent composition for fibers according to <36> or <37>, wherein a content of component (c) is preferably 0.1 mass % or more, more preferably 1 mass % or more and further preferably 10 mass % or more, and preferably 60 mass % or less, more preferably 50 mass % or less and further preferably 25 mass % or less.

<39>

A method for treating a textile product including, washing the textile product with a washing liquid obtained by mixing the following components (a) and (b) with water, and thereafter rinsing the textile product with water, component (a): an internal olefin sulfonate with 17 or more and 24 or less carbons, and component (b): a sulfosuccinic acid ester or a salt thereof having a hydrocarbon group with 5 or more and 18 or less carbons, wherein a proportion of a content of component (b) in the washing liquid to a total content of components (a) and (b) in the washing liquid is 20 mass % or more and less than 100 mass %.

<40>

The method for treating a textile product according to <39>, wherein component (a) has preferably 18 or more, and preferably 22 or less and more preferably 20 or less carbons.

<41>

The method for treating a textile product according to <39> or <40>, wherein component (b) is a sulfosuccinic acid diester or a salt thereof having two branched hydrocarbon groups with 5 or more and 18 or less carbons, the two hydrocarbon groups having 20 or more carbons in total.

<42>

The method for treating a textile product according to <39> or <40>, wherein component (b) is a compound represented by the following general formula (b1), (b1)

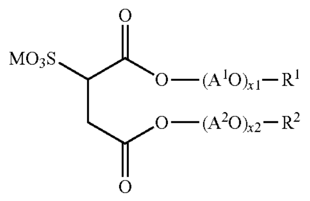

wherein $R^1$ and $R^2$ each represent a hydrocarbon group with 5 or more and 18 or less carbons and preferably a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<43>

The method for treating a textile product according to <42>, wherein the branched hydrocarbon groups of $R^1$ and $R^2$ in the general formula (b1) have a side chain with preferably 2 or more and more preferably 3 or more, and preferably 10 or less, more preferably 8 or less and further preferably 6 or less carbons, and $R^1$ and $R^2$ in the general formula (b1) are preferably branched alkyl groups with 8 or more and 12 or less carbons, more preferably branched alkyl groups with 10 or more and 12 or less carbons and further preferably branched alkyl groups with 10 carbons.

<44>

The method for reducing friction between fibers according to <42> or <43>, wherein $R^1$ and $R^2$ in the general formula (b1) each represent preferably a group selected from 2-ethylhexyl group and 2-propylheptyl group and more preferably 2-propylheptyl group.

<45>

The method for treating a textile product according to any of <39> to <44>, wherein the proportion of the content of component (b) to the total content of components (a) and (b) in the washing liquid is preferably 25 mass % or more and more preferably 50 mass % or more, and preferably 80 mass % or less and more preferably 75 mass % or less.

<46>

The method for treating a textile product according to any of <39> to <45>, wherein the washing liquid further contains the following component (c), component (c): a solvent having a hydroxyl group.

<47>

The method for treating a textile product according to <46>, wherein component (c) is one or more organic solvents selected from the following components (c1) to (c4), component (c1): a monohydric alcohol with 2 or more and 6 or less carbons, component (c2): a dihydric or more and dodecahydric or less alcohol with 2 or more and 12 or less carbons, component (c3): an organic solvent having a hydrocarbon group with 1 or more and 8 or less carbons (excluding an aromatic group that may be partially substituted), an ether group and a hydroxyl group, and component (c4): an organic solvent having an aromatic group that may be partially substituted, an ether group and a hydroxyl group.

<48>

The method for treating a textile product according to any of <39> to <47>, wherein a concentration of component (a) in the washing liquid is preferably 0.0001 mass % or more and more preferably 0.0005 mass % or more, and preferably 10 mass % or less and more preferably 1 mass % or less.

<49>

Use as a friction reducing agent for fibers of an agent containing the following components (a) and (b), component (a): an internal olefin sulfonate with 17 or more and 24 or less carbons, and component (b): a sulfosuccinic acid ester or a salt thereof having a hydrocarbon group with 5 or more and 18 or less carbons, wherein a proportion of a content of component (b) to a total content of components (a) and (b) is 20 mass % or more and less than 100 mass %.

<50>

The use according to <49>, wherein component (a) has preferably 18 or more, and preferably 22 or less and more preferably 20 or less carbons.

<51>

The use according to <49> or <50>, wherein component (b) is a sulfosuccinic acid diester or a salt thereof having two branched hydrocarbon groups with 5 or more and 18 or less carbons, the two hydrocarbon groups having 20 or more carbons in total.

<52>

The use according to <49> or <50>, wherein component (b) is a compound represented by the following general formula (b1), (b1)

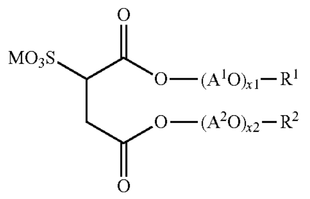

wherein $R^1$ and $R^2$ each represent a hydrocarbon group with 5 or more and 18 or less carbons and preferably a branched hydrocarbon group with 5 or more and 18 or less carbons, $A^1O$ and $A^2O$ each represent an alkyleneoxy group with 2 or more and 4 or less carbons, x1 and x2 each represent an average number of added moles, which is a number of 0 or more and 10 or less, and M represents a cation.

<53>

The use according to <52>, wherein $R^1$ and $R^2$ in the general formula (b1) each represent preferably a group selected from 2-ethylhexyl group and 2-propylheptyl group and more preferably 2-propylheptyl group.

EXAMPLES

The components used in the examples and comparative examples are listed below.

Component (a)

C18IOS: An internal olefin sulfonate potassium salt with 18 carbons. The mass ratio of olefin species (potassium olefin sulfonates) to hydroxy species (potassium hydroxy alkane sulfonates) in this C18IOS is 16/84. The sulfonic acid group position distribution of HAS species in this C18IOS has the following mass ratio: position 1/position 2/position 3/position 4/position 5/positions 6 to 9=1.5/22.1/17.2/21.8/13.5/23.9. Further, (IO-1S)/(IO-2S) is equal to 1.6 by mass ratio.

Note that the sulfonic acid group position distribution of HAS species included in this C18IOS was measured with liquid chromatography-mass spectrometry (hereinafter abbreviated as LC-MS). Note that internal olefin sulfonates in which a double bond is present at position 6 or more could not be clearly fractionated due to overlapping peaks. The devices and analytical conditions used for the measurements are as follows.

[Measuring Instrument]

LC device: "LC-20ASXR" (manufactured by SHIMADZU CORPORATION)

LC-MS device: "LCMS-2020" (manufactured by SHIMADZU CORPORATION)

Column: ODS Hypersil (length: 250 mm, inner diameter: 4.6 mm, particle size: 3 μm, manufactured by Thermo Fisher Scientific)

Detector: ESI (−), m/z=349.15 (C18), 321.10 (C16) and 293.05 (C14)

[Solvent]

Solvent A: 10 mM ammonium acetate aqueous solution

Solvent B: solution of acetonitrile/water=95/5 with 10 mM ammonium acetate added

[Elution Conditions]

Gradient: solvent A 60%, solvent B 40% (0-15 min)→solvent A 30%, solvent B 70% (15.1-20 min)→solvent A 60%, solvent B 40% (20.1-30 min)

Flow rate: 0.5 ml/min

Column temperature: 40° C.

Injection volume: 5 μl

Component (b)

Sodium di-2 ethylhexyl sulfosuccinate

Sodium bis-2-propylheptyl sulfosuccinate

Component (x) (Another Surfactant)

APES: a (polyoxypropylene) polyoxyethylene lauryl ether sulfate sodium salt, in which the alkyl group is derived from lauryl alcohol, the average number of added moles of the propyleneoxy group is 2 mol, and the average number of added moles of the ethyleneoxy group is 2 mol LAS: a sodium alkylbenzene sulfonate (alkyl composition: C10/C11/C12/C13=11/29/34/26 (mass ratio), mass average carbon number=17.75)

AES: a sodium polyoxyalkylene alkyl ether sulfate (EMAL 20C, manufactured by Kao Corporation)

Lauric acid: LUNAC L-98, manufactured by Kao Corporation

C16IOS: a potassium internal olefin sulfonate with 16 carbons obtained in the following production example

Production Example of C16IOS 7000 g (28.9 mol) of 1-hexadecanol (product name: KALCOL 6098, manufactured by Kao Corporation) and 700 g (10 mass % relative to the raw material alcohol) of γ-alumina (Strem Chemicals, Inc.) as a solid acid catalyst were prepared in a flask with a stirrer, and reacted under stirring while flowing nitrogen through the system (at 7000 mL/min.) at 280° C. for a reaction period of time appropriate for the intended internal olefin. The obtained crude internal olefin was transferred to a distillation flask and distilled at 136-160° C./4.0 mmHg, thereby obtaining an internal olefin with 16 carbons with an olefin purity of 100%.

The obtained internal olefin was sulfonated with sulfur trioxide gas in a thin-film sulfonation reactor having an outer jacket while passing cooling water at 20° C. through the reactor's outer jacket. The molar ratio of $SO_3$ to the internal olefin during the sulfonation reaction was set to 1.09. The obtained sulfonated product was added to an aqueous alkali solution prepared with potassium hydroxide in an amount 1.5 molar times the theoretic acid value, and neutralized while stirred at 30° C. for 1 hour. The neutralized product was hydrolyzed by heating in an autoclave at 160° C. for 1 hour to obtain a potassium C16 internal olefin sulfonate product. This composition was evaporated to dryness to obtain a potassium internal olefin sulfonate with 16 carbons. This C16IOS had the following content proportion (mass %): position 1/position 2/position 3/position 4/positions 5 to 8=0.7/32.1/24.2/25.8/17.2. (IO-1S)/(IO-2S) was equal to 4.8.

C12/14EO9PO2EO9: a polyoxyethylene polyoxypropylene polyoxyethylene mixed alkyl ether (a compound in which a polyoxyethylene group, a polyoxypropylene group and a polyoxyethylene group are bonded to a mixed alkyl group of an alkyl group with 12 carbons and an alkyl group with 14 carbons (7/3 by mass ratio) in this order, wherein the average numbers of added moles of the oxyethylene groups are 9 mol and 9 mol, and the average number of added moles of the oxypropylene group is 2 mol)

C12/14EO10: a polyoxyethylene mixed alkyl ether (in this compound, the mixed alkyl group is a mixed alkyl group of an alkyl group with 12 carbons and an alkyl group with 14 carbons (7/3 by mass ratio), and the average number of added moles of the oxyethylene group is 10 mol)

Example 1 and Comparative Example 1

The friction reducing agents for fibers of the compositions shown in Table 1 were prepared, and evaluated for the effect of reducing friction between fibers in the following manner. The results are shown in Table 1.

[Friction Between Fibers (Coefficient of Kinetic Friction in Wet Condition)]

(1) Pretreatment of Fibers (1-1) Pretreatment of Clothing Adjustment Cloth

About 1.6 kg of commercially available undershirts (GUNZE LIMITED, YG undershirt, 100% cotton, size L) was repeatedly washed consecutive five times in advance using a nonionic surfactant (an ethylene oxide adduct of lauryl alcohol (average number of added moles of 8)) in fully automatic washing machine Panasonic NA-F70PB1 (the used amount of the nonionic surfactant 4.5 g, standard course, water amount 45 L, water temperature 25° C., washing time 12 minutes, water-saving rinsing twice). After that, they were dried for one day under the condition of 25° C. and 43% RH.

(1-2) Pretreatment of Cotton Towel

Commercially available towels (SENSHU TOWEL, 100% cotton, 34 cm×86 cm×24 towels) were repeatedly washed consecutive five times in advance using a nonionic surfactant (an ethylene oxide adduct of lauryl alcohol (average number of added moles of 8)) in fully automatic washing machine Panasonic NA-F70PB1 (the used amount of the nonionic surfactant 4.5 g, standard course, water amount 45 L, water temperature 25° C., washing time 10 minutes, water-saving rinsing twice). After that, they were dried for one day under the condition of 25° C. and 43% RH.

(2) Treatment of Evaluation Test Cloth in Drum-Type Washing Machine 24 g of each friction reducing agent for fibers in Table 1 was weighed, with which two towels pretreated as described above were washed three times in a drum-type washing and drying machine (manufactured by Panasonic Corporation, NA-VX3800L) under the condition of tap water (25° C.), a total amount of 4 kg of clothing and the standard course (washing for 15 minutes, rinsing once, dehydration for 5 minutes). The mass of clothing was adjusted by using the undershirts pretreated as clothing adjustment cloth as described above. After that, they were removed from the washing tub, lightly shaken and hung up, and then, left to dry for one day under the condition of 25° C. and 43'RH. After drying, the plain weave portions of the towels were cut into 2 cm×2 cm pieces, which were used as test pieces.

(3) Fiber Friction Measurement

Kinetic friction measurements were carried out with a kinetic friction measurement machine (TL201Tt manufactured by Trinity-Lab. Inc.) using the towel pieces treated in the above (2). With a towel piece (2 cm×2 cm) attached to a friction measurement section with double-sided tape, 100 μL of an aqueous solution in which each friction reducing agent for fibers in Table 1 was dissolved at a concentration of 0.53 g/L was added dropwise onto the attached towel piece, and measurements were carried out at a load of 70 g and a rate of 1.0 mm/s three times to determine the average value of the three measurements as a measurement value. The results are shown in Table 1.

TABLE 1

| | | | | Example | | | | | | Comparative example | | | | |
|---|---|---|---|---|---|---|---|---|---|---|---|---|---|---|
| | | | | 1-1 | 1-2 | 1-3 | 1-4 | 1-5 | 1-6 | 1-1 | 1-2 | 1-3 | 1-4 | 1-5 |
| Friction reducing agent for | Formulation component | (a) | C18IOS | 10 | 5 | 10 | 15 | 10 | 10 | | | | 17 | 20 |
| | | (b) | Sodium di-2-ethylhexyl sulfosuccinate | 10 | | | | | | | 20 | | | |

TABLE 1-continued

| | | | Example | | | | | | Comparative example | | | | |
|---|---|---|---|---|---|---|---|---|---|---|---|---|---|
| | | | 1-1 | 1-2 | 1-3 | 1-4 | 1-5 | 1-6 | 1-1 | 1-2 | 1-3 | 1-4 | 1-5 |
| fibers | (mass %) | Sodium bis-2-propylheptyl sulfosuccinate | | 15 | 10 | 5 | 10 | 10 | | | 20 | 3 | |
| | (x) | APES | | | | | | 10 | | | | | |
| | | C12/14EO9PO2EO9 | | | | | 10 | | | | | | |
| | (c) | Propylene glycol | 5 | 5 | 5 | 5 | 5 | 5 | 5 | 5 | 5 | 5 | 5 |
| | | Butyldiglycol | 5 | 5 | 5 | 10 | | | | | | 5 | |
| | | Water | Balance | Balance | Balance | Balance | Balance | Balance | Balance | Balance | Balance | Balance | Balance |
| | | Total | 100 | 100 | 100 | 100 | 100 | 100 | 100 | 100 | 100 | 100 | 100 |
| (b)/[(a) + (b)] (mass %) | | | 50 | 75 | 50 | 25 | 50 | 50 | — | 100 | 100 | 15 | 0 |
| Friction between fibers (coefficient of kinetic friction in wet condition) | | | 0.21 | 0.20 | 0.19 | 0.22 | 0.21 | 0.20 | 1.02 | 0.32 | 0.23 | 0.26 | 0.31 |

Example 2 and Comparative Example 2

The liquid detergent compositions for fibers shown in Table 2 were prepared in the following manner and evaluated for the items below. The results are shown in Table 2.

[Preparation of Liquid Detergent Composition for Fibers]

A Teflon® stirrer piece with a length of 5 cm was placed in a glass beaker with a capacity of 200 mL, and the mass of them was measured. Next, 20 g of ion exchange water at 25° C., component (c), then component (a), and then component (b) and/or component (x), were placed in the beaker in this order, and the top of the beaker was sealed with Saran Wrap®. The beaker having the contents therein was put in a water bath at 60° C. set on a magnetic stirrer, and the contents were stirred at 100 r/min for 30 minutes while keeping the temperature of water in the water bath in the temperature range of 60±2° C. After that, the pH of the contents was adjusted to a pH of 7 with an alkali agent (monoethanolamine) or an acid agent (citric acid). The pH measurements were made by the pH measurement method described earlier. Next, after water in the water bath was replaced with tap water at 5° C. and the composition in the beaker was cooled to a temperature of 25° C., other components were further placed therein and stirred for 10 minutes. Next, Saran Wrap® was removed and ion exchange water was added such that the mass of the contents reached 200 g, and the contents were stirred again at 100 r/min for 5 minutes, thus obtaining the liquid detergent compositions for fibers listed in Table 2.

[Method for Evaluating Washing Performance]

(1) Preparation of Model Sebum Artificial Stain Cloth

A model sebum artificial stain liquid of the composition shown below was adhered to cloth to prepare model sebum artificial stain cloth. The model sebum artificial stain liquid was printed on the cloth with a gravure roll coater, thereby adhering the artificial stain liquid to the cloth. The step of adhering the model sebum artificial stain liquid to the cloth to prepare the model sebum artificial stain cloth was carried out with a gravure roll cell capacity of 58 $cm^3/m^2$, a coating rate of 1.0 m/min, a drying temperature of 100° C. and a drying time of 1 minute. Cotton 2003 (manufactured by Tanigashira Shoten) was used as the cloth.

The composition of the model sebum artificial stain liquid was as follows: lauric acid 0.4 mass %, myristic acid 3.1 mass %, pentadecanoic acid 2.3 mass %, palmitic acid 6.2 mass %, heptadecanoic acid 0.4 mass %, stearic acid 1.6 mass %, oleic acid 7.8 mass %, triolein 13.0 mass %, n-hexadecyl palmitate 2.2 mass %, squalene 6.5 mass %, egg white lecithin liquid crystal 1.9 mass %, Kanuma red soil 8.1 mass %, carbon black 0.01 mass %, and the balance of the composition was water (100 mass % in total).

(2) Evaluation of Washing Power

Five pieces of the above prepared model sebum artificial stain cloth (6 cm×6 cm) were washed with a tergotometer (Ueshima, MS-8212) at 85 rpm for 10 minutes. All washes were made under the following washing condition: city water (3.5° dH, 25° C.) was added to the liquid detergent compositions for fibers listed in Table 2 such that the concentration of the compositions was 0.083 mass %; and the water temperature was 25° C. After washing, rinsing with city water (25° C.) for 3 minutes, and then drying, were performed. The washing rates (%) of the five pieces were measured by the following method, and the average value thereof was determined. The results are shown in Table 2. Note that the reflectances at 550 nm of the original cloth before staining and before and after washing were measured with a colorimeter (manufactured by NIPPON DENSHOKU INDUSTRIES Co., Ltd., Z-300A). In this evaluation, a washing rate of 20% or more is desirable, and a higher numerical value is more preferable.

$$\text{Washing rate (\%)}=100\times[(\text{reflectance after washing}-\text{reflectance before washing})/(\text{reflectance of original cloth}-\text{reflectance before washing})]$$

[Method for Evaluating Softening Performance and Wrinkle Suppressing Performance]

(1) Pretreatment of Evaluation Test Cloth (1-1) Pretreatment of Cotton Towel

About 1.6 kg of commercially available towels (SENSHU TOWEL, 100% cotton, 34 cm×86 cm×12 towels) was repeatedly washed consecutive five times in advance using a nonionic surfactant (an ethylene oxide adduct of lauryl alcohol (average number of added moles of 8)) in fully automatic washing machine Panasonic NA-F70PB1 (the used amount of the nonionic surfactant 4.5 g, standard course, water amount 45 L, water temperature 25° C., washing time 10 minutes, water-saving rinsing twice). After that, they were dried for one day under the condition of 25° C. and 43% RH.

(1-2) Pretreatment of Cotton T-Shirt

About 1.5 kg of commercially available T-shirts (UNIQLO, crew neck T-shirt (M), 100% cotton, 10 T-shirts)

was repeatedly washed consecutive five times in advance using a nonionic surfactant (an ethylene oxide adduct of lauryl alcohol (average number of added moles of 8)) in fully automatic washing machine Panasonic NA-F70PB1 (the used amount of the nonionic surfactant 4.5 g, standard course, water amount 45 L, water temperature 25° C., washing time 10 minutes, water-saving rinsing twice). After that, they were dried for one day under the condition of 25° C. and 43% RH.

(1-3) Pretreatment of Clothing Adjustment Cloth

About 1.6 kg of commercially available undershirts (GUNZE LIMITED, YG undershirt, 100% cotton, size L) was repeatedly washed consecutive five times in advance using a nonionic surfactant (an ethylene oxide adduct of lauryl alcohol (average number of added moles of 8)) in fully automatic washing machine Panasonic NA-F70PB1 (the used amount of the nonionic surfactant 4.5 g, standard course, water amount 45 L, water temperature 25° C., washing time 12 minutes, water-saving rinsing twice). After that, they were dried for one day under the condition of 25° C. and 43% RH.

(2) Washing of Evaluation Fibers 24 g of each composition in Table 2 was weighed, with which two towels and two T-shirts pretreated as described above were washed three times in a drum-type washing and drying machine (manufactured by Panasonic Corporation, NA-VX3800L) under the condition of tap water (25° C.) and a total amount of 4 kg of clothing. The mass of clothing was adjusted by using the undershirts pretreated as clothing adjustment cloth as described above. After that, they were removed from the washing tub, lightly shaken and hung up, and then, left to dry for one day under the condition of 25° C. and 43% RH.

(3) Evaluation of Softening Performance

The softness of the cotton towels treated with the liquid detergent compositions for fibers listed in Table 2 as described in (2) was scored on the basis of the criteria below by six persons skilled in fiber texture evaluation, and the average scores of the six persons were calculated. Then, scores for the cotton towels were obtained per composition from one evaluator, and the average value thereof was used as his/her evaluation score for that composition. Those evaluation scores given by the six persons were totaled and the average score was calculated. The results are shown in Table 2. The table shows values rounded off to one decimal place. In this evaluation, an average score of 1 or more is preferable, and a higher numerical value is preferred.

−1 . . . cotton towels were not finished softer than those treated with the composition of comparative example 2-1

0 . . . cotton towels were finished as soft as those treated with the composition of comparative example 2-1

1 . . . cotton towels were finished slightly softer than those treated with the composition of comparative example 2-1

2 . . . cotton towels were finished softer than those treated with the composition of comparative example 2-1

3 . . . cotton towels were finished much softer than those treated with the composition of comparative example 2-1

(4) Evaluation of Wrinkle Suppressing Performance

The condition of wrinkles in the T-shirts washed with the liquid detergent compositions for fibers listed in Table 2, rinsed and dried was scored on the basis of the criteria below by six persons skilled in fiber texture evaluation, and the average scores of the six persons were calculated. The results are shown in Table 2. The table shows values rounded off to one decimal place. In this evaluation, an average score of 1 or more is preferable, and a higher numerical value is preferred.

−1 . . . T-shirts were finished with more wrinkles than those treated with the composition of comparative example 2-1

0 . . . T-shirts were finished equal in the condition of wrinkles to those treated with the composition of comparative example 2-1

1 . . . T-shirts were finished with slightly less wrinkles than those treated with the composition of comparative example 2-1

2 . . . T-shirts were finished with less wrinkles than those treated with the composition of comparative example 2-1

3 . . . T-shirts were finished with much less wrinkles than those treated with the composition of comparative example 2-1

TABLE 2

| | | | | Example | | | | | | | | | | |
|---|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 | 2-11 |
| Liquid detergent composition for fibers | Formulation component (mass %) | (a) | C18IOS | 15 | 5 | 15 | 20 | 10 | 15 | 10 | 15 | 5 | 15 | 15 |
| | | (b) | Sodium di-2-ethylhexyl sulfosuccinate | 5 | | | | | | | | | | |
| | | | Sodium bis-2-propylheptyl sulfosuccinate | | 15 | 5 | 5 | 10 | 5 | 10 | 5 | 10 | 5 | 5 |
| | | (x) | APES | | | | | | | 10 | | 10 | 10 | |
| | | | LAS | | | | | | | | 5 | | | |
| | | | AES | | | | | | | | | | | |
| | | | Lauric acid | | | | | | | | | | | |
| | | | C16IOS | | | | | | | | | | | |
| | | | C12/14EO9PO2EO9 | | | | | 10 | 10 | | 5 | | | |
| | | | C12/14EO10 | | | | | | | | | | | 10 |
| | | (c) | Propylene glycol | 5 | 5 | 5 | 5 | 5 | 5 | 5 | 5 | 5 | 5 | 5 |
| | | | Phenylglycol | 3 | 3 | 3 | 3 | 3 | 3 | 3 | 3 | 3 | 3 | 3 |
| | | | Butyldiglycol | 5 | 5 | 5 | 5 | 5 | 5 | 5 | 5 | 5 | 5 | 5 |

TABLE 2-continued

| | | | | | | | | | | | | |
|---|---|---|---|---|---|---|---|---|---|---|---|---|
| Optional component | Monoethanolamine | 1 | 1 | 1 | 1 | 1 | 1 | 1 | 1 | 1 | 1 | 1 |
| | Citric acid | 0.5 | 0.5 | 0.5 | 0.5 | 0.5 | 0.5 | 0.5 | 0.5 | 0.5 | 0.5 | 0.5 |
| | Fragrance | 1 | 1 | 1 | 1 | 1 | 1 | 1 | 1 | 1 | 1 | 1 |
| | Water | Balance | Balance | Balance | Balance | Balance | Balance | Balance | Balance | Balance | Balance | Balance |
| Total | | 100 | 100 | 100 | 100 | 100 | 100 | 100 | 100 | 100 | 100 | 100 |
| (b)/[(a) + (b)] (mass %) | | 25 | 75 | 25 | 20 | 50 | 25 | 50 | 25 | 66.7 | 25 | 25 |
| Washing rate (%) | | 21.80 | 20.20 | 22.10 | 29.00 | 36.80 | 41.20 | 37.10 | 38.10 | 36.30 | 42.30 | 43.10 |
| Softening performance | | 2.2 | 3.0 | 2.8 | 3.0 | 3.0 | 3.0 | 3.0 | 3.0 | 2.7 | 3.0 | 3.0 |
| Wrinkle suppressing performance | | 2.5 | 2.8 | 2.8 | 3.0 | 2.8 | 2.8 | 2.8 | 3.0 | 2.0 | 3.0 | 3.0 |

| | | | | Comparative example | | | | | | | | | |
|---|---|---|---|---|---|---|---|---|---|---|---|---|---|
| | | | | 2-1 | 2-2 | 2-3 | 2-4 | 2-5 | 2-6 | 2-7 | 2-8 | 2-9 | 2-10 |
| Liquid detergent composition for fibers | Formulation component (mass %) | (a) | C18IOS | 20 | 18 | | | | 10 | | 10 | 10 | 18 |
| | | (b) | Sodium di-2-ethylhexyl sulfosuccinate | | | 20 | | | | | | | |
| | | | Sodium bis-2-propylheptyl sulfosuccinate | | 2 | | 20 | | | 10 | | | 2 |
| | | (x) | APES | | | | | | | | | | |
| | | | LAS | | | | | 20 | | | | | |
| | | | AES | | | | | | | | 10 | | |
| | | | Lauric acid | | | | | | | | | 10 | |
| | | | C16IOS | | | | | | | 10 | | | |
| | | | C12/14EO9PO2EO9 | | | | | | | | | | |
| | | | C12/14EO10 | | | | | | 10 | | | | |
| | | (c) | Propylene glycol | 5 | 5 | 10 | 10 | 5 | 5 | 5 | 5 | 5 | 5 |
| | | | Phenylglycol | 3 | 3 | | 3 | | 3 | 3 | 3 | 3 | 3 |
| | | | Butyldiglycol | 5 | 5 | | | 5 | 5 | 5 | 5 | 5 | 5 |
| | | Optional component | Monoethanolamine | 1 | 1 | 1 | | | | 1 | 1 | 1 | 1 |
| | | | Citric acid | 0.5 | 0.5 | 0.5 | 0.5 | 0.5 | 0.5 | 0.5 | 0.5 | 0.5 | 0.5 |
| | | | Fragrance | 1 | 1 | 1 | 1 | 1 | 1 | 1 | 1 | 1 | 1 |
| | | | Water | Balance | Balance | Balance | Balance | Balance | Balance | Balance | Balance | Balance | Balance |
| Total | | | | 100 | 100 | 100 | 100 | 100 | 100 | 100 | 100 | 100 | 100 |
| (b)/[(a) + (b)] (mass %) | | | | 0 | 10 | 100 | 100 | 1 | 0 | 100 | 0 | 0 | 10 |
| Washing rate (%) | | | | 27.21 | 25.31 | 5.55 | 1.79 | 25.53 | 38.40 | 30.1 | 32.03 | 20.26 | 25.31 |
| Softening performance | | | | (Reference) | 0 | 0.7 | 1.2 | 0.5 | −1.0 | 0.7 | −1.0 | −0.7 | 0 |
| Wrinkle suppressing performance | | | | (Reference) | 0 | 0.2 | 0.3 | −1.0 | −0.7 | −0.8 | −1.0 | −0.5 | 0 |

The invention claimed is:

1. A friction reducing agent for fibers comprising the following components (a) and (b),
   - component (a): an internal olefin sulfonate having 18 carbons, and
   - component (b): a compound comprising a cation and bis-2-propylheptyl sulfosuccinate as an anion;
   - wherein a proportion of a content of the component (b) to a total content of the components (a) and (b) is 20 mass % to 75 mass %.

2. A method for reducing friction between fibers comprising, bringing the following components (a) and (b) into contact with the fibers in such amounts that a proportion of an amount of the component (b) to a total amount of the components (a) and (b) is 20 mass % to 75 mass %,
   - component (a): an internal olefin sulfonate having 18 carbons, and
   - component (b): a compound comprising a cation and bis-2-propylheptyl sulfosuccinate as an anion.

3. A detergent composition for fibers comprising the following components (a) and (b),
   - component (a): an internal olefin sulfonate having 18 carbons, and
   - component (b): a compound comprising a cation and bis-2-propylheptyl sulfosuccinate as an anion;
   - wherein a proportion of a content of the component (b) to a total content of the components (a) and (b) is 20 mass % to 75 mass %.

4. A method for treating a textile product comprising, washing the textile product with a washing liquid obtained by mixing the following components (a) and (b) with water, and thereafter rinsing the textile product with water,
   - component (a): an internal olefin sulfonate having 18 carbons, and
   - component (b): a compound comprising a cation and bis-2-propylheptyl sulfosuccinate as an anion;
   - wherein a proportion of a content of the component (b) in the washing liquid to a total content of the components (a) and (b) in the washing liquid is 20 mass % to 75 mass %.

5. The friction reducing agent according to claim 1, wherein the compound comprising bis-2-propylheptyl sulfosuccinate is sodium bis-2-propylheptyl sulfosuccinate.

6. The method according to claim 2, wherein the compound comprising bis-2-propylheptyl sulfosuccinate is sodium bis-2-propylheptyl sulfosuccinate.

7. The detergent composition according to claim 3, wherein the compound comprising bis-2-propylheptyl sulfosuccinate is sodium bis-2-propylheptyl sulfosuccinate.

8. The method according to claim 4, wherein the compound comprising bis-2-propylheptyl sulfosuccinate is sodium bis-2-propylheptyl sulfosuccinate.

* * * * *